Figures 1, 2, 3, 4:
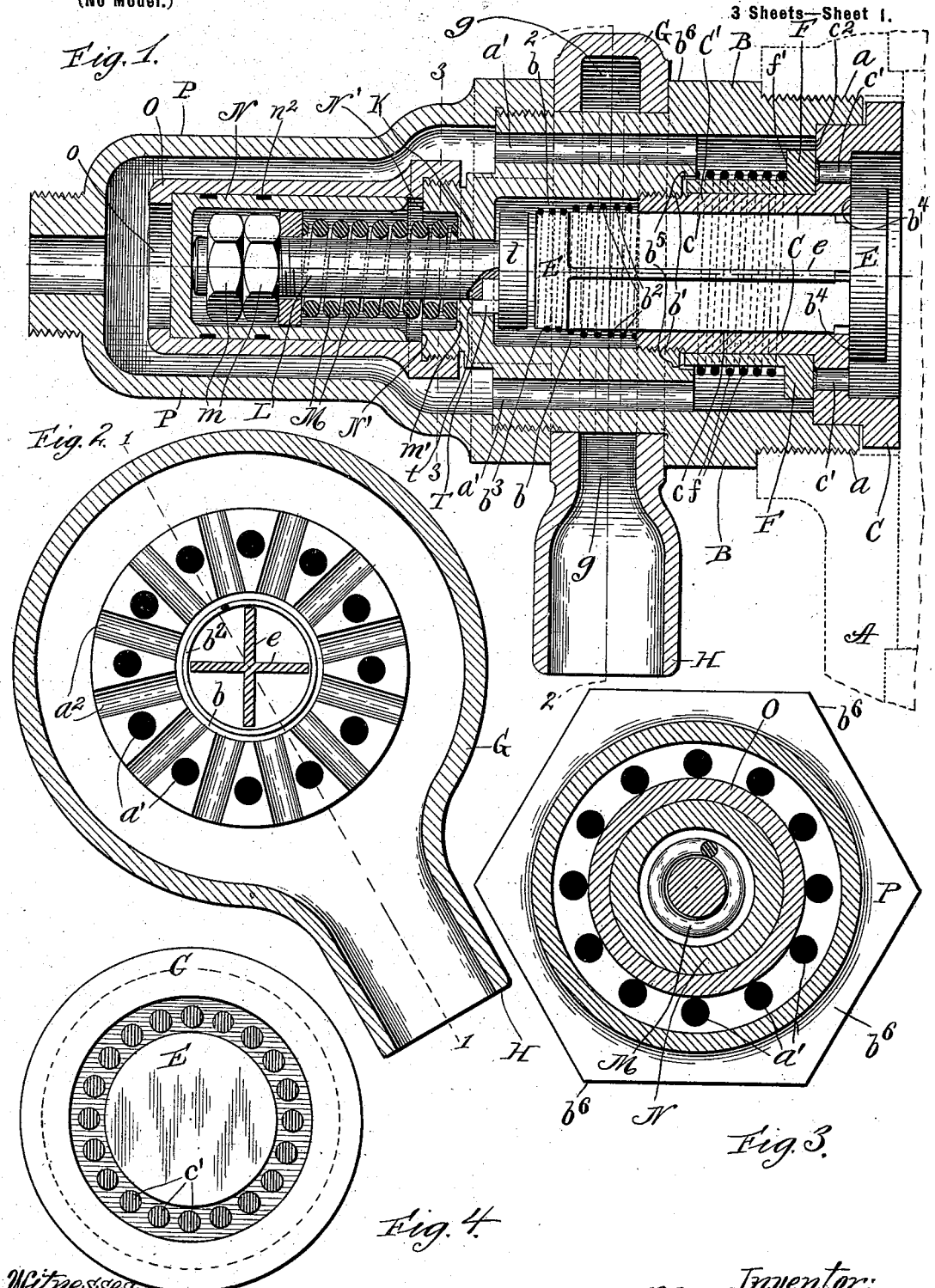

No. 635,424. Patented Oct. 24, 1899.
N. A. CHRISTENSEN.
COMBINED VALVE AND GOVERNOR FOR AIR BRAKE PUMPS.
(Application filed Mar. 19, 1895.)
(No Model.) 3 Sheets—Sheet 1.

Witnesses:
Inventor:
Niels Anton Christensen.
By his Attys.

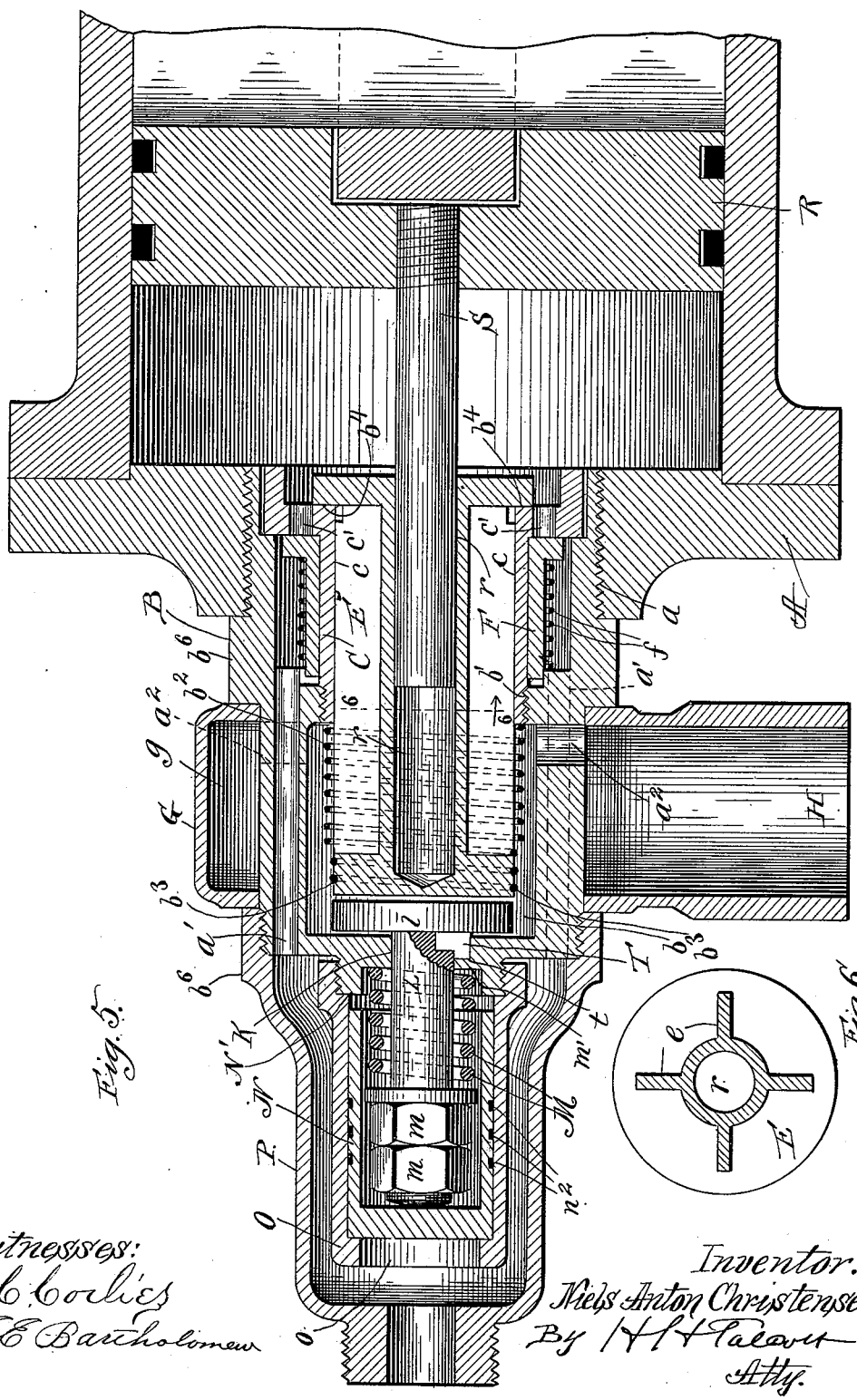

No. 635,424. Patented Oct. 24, 1899.
N. A. CHRISTENSEN.
COMBINED VALVE AND GOVERNOR FOR AIR BRAKE PUMPS.
(Application filed Mar. 19, 1895.)
(No Model.) 3 Sheets—Sheet 3.
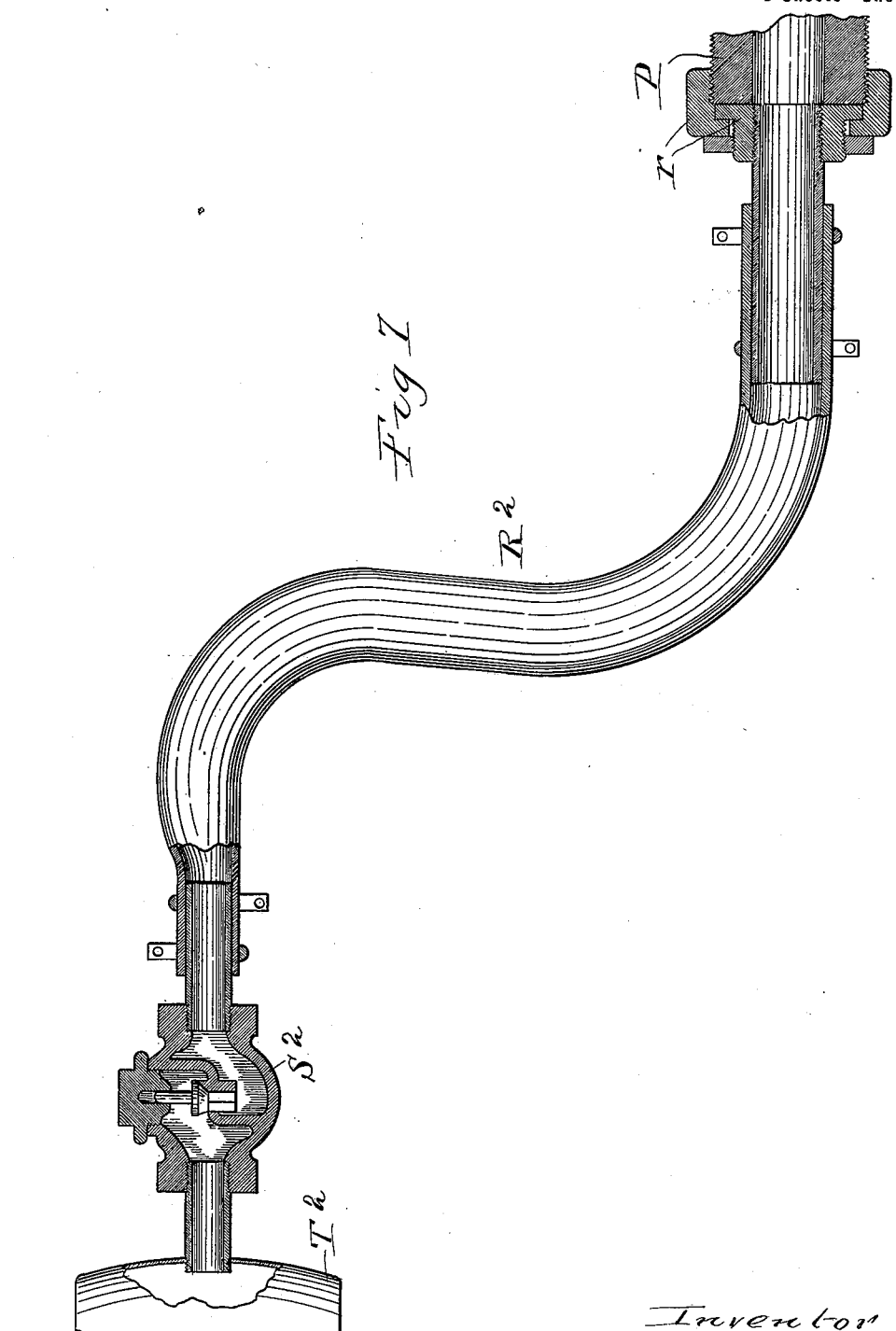
Witnesses
Inventor
Niels Anton Christensen

United States Patent Office.

NIELS ANTON CHRISTENSEN, OF MILWAUKEE, WISCONSIN.

COMBINED VALVE AND GOVERNOR FOR AIR-BRAKE PUMPS.

SPECIFICATION forming part of Letters Patent No. 635,424, dated October 24, 1899.

Application filed March 19, 1895. Serial No. 542,379. (No model.)

*To all whom it may concern:*

Be it known that I, NIELS ANTON CHRISTENSEN, a subject of the King of Denmark, residing at Milwaukee, in the county of Milwaukee and State of Wisconsin, have invented a new and useful Improvement in Valves and Governors for Air-Compressors, which is fully set forth in the following specification, reference being had to the accompanying drawings, in which—

Figure 1 represents a longitudinal section on the line 1 1 of Fig. 2. Fig. 2 represents a section on the line 2 2 of Fig. 1. Fig. 3 is a section taken on the line 3 3 of Fig. 1. Fig. 4 represents an end elevation showing parts of my invention at their place of connection with the compressor-cylinder. Fig. 5 also represents a longitudinal section taken on the line 1 1 of Fig. 2, but adding an arbor or rod fixed to the piston. Fig. 6 is a cross-section on the line 6 6 of Fig. 5, and Fig. 7 is a side elevation representing the connecting-pieces between the governor and reservoir and showing the check-valve.

My invention relates to improvements in the method of induction of air into the cylinder of an air-pump and the discharge of the air so inducted into pipes leading into the air-reservoir, and it also relates to the devices whereby the pressure of air in the reservoir may be regulated, so that when the air in the reservoir is sufficiently compressed the air instead of being further compressed into the reservoir is allowed to escape into the open air until the pressure is reduced in the reservoir.

My invention consists of a suction-valve and a discharge-valve with a governor for regulating the pressure of the air arranged and combined in and with a cylinder or shell in an air-brake apparatus, the said valve and governor with their different parts and accessories being properly secured to or within said shell, which is preferably cast in one piece, or it may be cast in one with the cylinder-cover.

My invention also consists of various other devices and inventions hereinafter described.

All the different parts are metal, the principal parts being preferably of brass.

Like letters refer to like parts in all the different figures.

In the drawings, A represents a cover which is secured in any proper manner to the end of the compressor-cylinder or pump, in which cylinder an air-tight piston is moving back and forth. To this cover A is secured in any suitable manner the shell B, which is shown to be secured to the cover A by screw-threads $a$. Such a method, however, is not necessary, as it may be so secured by any proper means or it may be cast in one piece therewith. The shell B is cylindrical, or it may be partly cylindrical and partly hexagonal, as shown in the drawings in Fig. 3. Within the shell B are chambers of various diameters, as hereinafter described, and said shell is adapted to receive and sustain the different devices and parts of my invention, as hereinafter stated. The shell B has extending through it longitudinally holes $a'$, which are bored through it near the circumference, as shown in Fig. 2 of the drawings. The shell B has also holes $a^2$ running radially toward its center and at right angles to the holes $a'$, as also shown in Fig. 2. The holes $a'$ and $a^2$ have no connection with or relation to each other and perform different offices. The front end of the shell B is adapted to receive a bushing C, which may be secured to the shell B in any suitable manner. It is shown in the drawings to be secured to the shell B in the smaller chamber $b$ of the shell B at its rear end by screw-threads $b'$. The space between the outer edge or circumference of the bushing C and its inside surface is perforated with a circle of holes $c'$, extending longitudinally through the enlarged part of said bushing C and terminating at the shoulder $c^2$ of said bushing, the said holes $c'$ being so arranged and formed that the discharge-valve hereinafter mentioned, having its seat upon the shoulder $c^2$ of the bushing C, may cover said holes $c'$.

E is a suction-valve. (Shown in Fig. 1.) The valve E has its seat on the outer end of the bushing C, where this seat is shown to be flat. It may be, however, of any suitable form to accomplish the object desired. The valve E extends through the circular chamber $c$, formed in the center of the bushing C, and projects beyond the said bushing and into the chamber $b$ of the shell B. At the inner end of the valve E is a coiled spring $b^2$, firmly secured to the valve E at its lower end, grooves $b^3$ being formed in the lower end of the valve E for this purpose. The other end of the spring $b^2$ bears against the inner end or stem of the bushing C, by which it is compressed in such a manner that it always tends to draw the suction-valve E onto its seat $b^4$ at the outer end of the bushing C. The valve E is preferably cast in one piece, with a solid head on each end and ribs $e$ extending longitudinally on the valve and at desired intervals. The under side of the larger or outer end of the valve E forms the seat of the valve, while the other end is threaded for receiving the spring $b^2$, as before stated. The part of the spring $b^2$ which is secured to the end of the valve is firmly secured to it, while the part of the spring projecting over the wings or ribs $e$ of the valve E is slightly larger in circumference than such ribs in order to give a certain clearance for the valve E, so that it is enabled to have free movements for the purposes hereinafter stated.

F is a discharge-valve sleeved on the stem $C'$ of the bushing C in such a manner as to move freely on said bushing. The valve F has its seat on the shoulder $c^2$ on the inner end of the bushing C and sits upon said bushing in such a manner as to cover the holes $c'$ in the bushing C, as before stated. The smaller end of the stem of the valve F extends into the chamber $b^5$ in the shell B. A light coiled spring $f$ encircles the stem of the valve F and is compressed between the shoulder $f'$ of the valve at one end and on projections forming shoulders in the chamber $b^5$ of the shell B on the other. The office of the spring $f$ is to close the valve F at the proper time. The recess or chamber $b^5$, into which the stem of the valve F extends, is for the purpose of giving said valve F a longer bearing and also for preventing the spring $f$ from working itself underneath the valve F, and thereby preventing its proper movements.

G is a sleeve mounted on the shell B between the shoulders formed by the hexagonal projection $b^6$ on one side and the base of the cap P on the other, with an annular chamber $g$ in its inner side and having a spout H adapted to receive upon it the suction-hose. This latter is not shown in the drawings. The sleeve G is so arranged on the shell B that the radial holes $a^2$ are covered by said sleeve. The sleeve G moves freely around the shell B between the shoulders before stated, as shown in Figs. 1 and 2. The spout H on the sleeve G is for the purpose of attaching a hose or other suitable device to it, which is intended to be taken inside of the car for the purpose of supplying air which is free from dust or other foreign substances into the pump-cylinder, as hereinafter described. At the other end of the shell B are arranged devices by means of which the air which is pushed by the piston into the shell B is received and discharged into the pipe leading to the air-reservoir and also devices for regulating the pressure or amount of air compressed into said reservoir, which I will now describe.

In the center of the rear end of the shell B is a hole K, through which a bolt L passes. The head $l$ of the bolt L is held within the shell B at such a point that it will not touch or be in contact with the lower end of the valve E or any part of said valve when said valve is resting on its seat on the bushing C, except when the said bolt L is subjected to a pressure, as hereinafter stated. The bolt L is screw-threaded and has upon its inner end nuts $m$. A coil-spring M is arranged on bolt L and is compressed or held between the nut $m$ and a recess in the shell B, forming shoulder $m'$ for the purpose of serving for a seat for the spring M at its other end in order that spring M may perform its office, as hereinafter stated, which is to hold the bolt L normally in such a position that the head $l$ shall not come into contact with the lower surface of the inner end of the valve E, as before stated. The lower end of the bolt L and the spring M and also the nuts $m'$ are surrounded by a plunger N. The plunger N is a cylinder constructed of one piece open at its inner end. The plunger N is adapted and designed to be moved outwardly and inwardly by the action of the reservoir-pressure in one case and by the action of the spring M in the other. Its inward movement is limited by the stop $N^2$, secured to or formed on the shell B and upon which stop the plunger N may rest at its open end. The said plunger N is provided with suitable packing $n^2$.

Surrounding the plunger N is a cap O, closely fitting to the plunger N, so that there shall be no air-space whatever between the cap O and the plunger N. The cap O is fastened in a suitable manner to the shell B, so that the connection between the two shall be air-tight. I have shown it to be screw-threaded to the shell B. The cap O is open at its outer end, having a hole $o$ smaller in size than the end of the plunger N, for the purpose hereinafter stated. Surrounding the plunger N and the cap O is the cylinder or larger cap P, secured to the end of the shell B, so as to form an air-tight connection at such a point of the shell B near its outer end that the holes $a'$, extending longitudinally through the shell B, open into the cylinder P. I have shown in the drawings that the cylinder P is screwed onto the end of the shell B. This method is not necessary, however, provided, as before stated, that such connection is air-tight.

The operation of my governor and valves is as follows: The air being sucked in through the radial holes $a^2$ and through the suction-valve E to the pump-cylinder and then driven by the piston R through the holes $c'$ in the bushing C opens the discharge-valve F, which has its seats over the holes $c'$ and passes through the longitudinal holes $a'$ in the shell B into the cylinder P and through the annular space between the cylinder P and the cap O and then through proper piping or hose into the air-reservoir. The piping or hose is connected with a hole in the end of the cap P and is fitted with a check-valve $S^2$ of ordinary construction. (Shown in Fig. 7.) The purpose of the valve $S^2$ is to retain the compressed air in the reservoir and to prevent its leaking out of said reservoir when the car is not in motion, as it has been found that it is impossible in such a construction with a sliding piston to prevent the compressed air from escaping in some slight degree. The check-valve $S^2$ is placed in the piping $R^2$ at a point in said piping near the air-reservoir $T^2$. The middle part of said piping $R^2$ is of some flexible material secured in some suitable manner to the metallic part of said piping at each end, as shown in Fig. 7, and said piping is secured to the cap-cylinder P by a nut $r$, as shown in Fig. 7, or it may be secured in another proper manner. At the other end the said piping is secured to the air-reservoir $T^2$, into which it opens. This action of compressing air into the reservoir in the manner described is continued until the pressure in the reservoir has reached a certain intensity, depending upon the strength of the spring M inside the plunger N. The outer side of the end of the plunger N is exposed to the pressure from the air-reservoir, while on the inside of its closed end it has the pressure of the spring M acting upon it. Now when the pressure from the reservoir acting upon the end of the plunger N exceeds the resistance of the spring M then the plunger N and bolt L will move inwardly, bringing the head of the bolt L into contact with the rear end of the suction-valve E and preventing the suction-valve E from closing, thus allowing the air which has been sucked through the valve by the action of the piston R to escape back into the atmosphere instead of being compressed and stored in the reservoir. The movement of the plunger N is limited by the stop N'. This action is continued until the reservoir-pressure is sufficiently reduced, so that the force of the spring M will again force the bolt L and plunger N back again into their normal position, and the pump will again compress air in the manner before stated until a maximum is again reached, when the release will again take place, as before described.

In Fig. 5 I have shown a device for preventing the suction-valve E from falling into the pump-cylinder should the valve E at any time break or the spring $b^2$ at its rear end disengage itself. This device consists of an arbor or rod S, which is preferably secured in a suitable manner to the piston R and passes through a suitable hole or opening $r$ through the head of said valve and into its stem a sufficient distance, so that the rod S shall be of such length that the movement of the piston backward and forward shall not remove said rod S from its connection with the valve E. The rod S is adapted to move outwardly and inwardly freely in said valve through the said opening.

T is a key whose office is to prevent the bolt L from turning around when the tension of the spring M is being adjusted by the nut $m$. This key is of any suitable form, usually a flat piece of metal, inserted in a recess formed in the bolt L adjoining its head and the shell B, as shown in Figs. 1 and 7. The key is put in position before the bolt is inserted, and the slots or recesses in the shell B and the bolt L are of sufficient length to allow the key to be moved outwardly and inwardly with the motion of the bolt L, while at the same time it prevents the said bolt from turning around.

$t$ is a stop which limits the movements of the key.

What I claim, and wish to secure by Letters Patent, is—

1. In a combined valve and governor for air-compressors the combination of a case having a valve-chamber adapted to communicate at one end with the compressor-cylinder, a piston-chamber opening into the opposite end of said valve-chamber, an inlet-opening into said valve-chamber and a fluid-pressure connection between said piston-chamber and the discharge of the compressor, a suction-valve, a spring tending to hold said valve to its seat, a piston fitted in the piston-chamber and exposed on one side to pressure produced by the compressor, a bolt projecting at one end into the valve-chamber and at the opposite end into the piston-chamber, and a spring acting upon said bolt in opposition to the fluid-pressure to which said piston is exposed, substantially as and for the purposes set forth.

2. In a combined valve and governor for air-compressors the combination of a case attachable to and adapted to communicate at one end with the compressor-cylinder, and having valve and piston chambers arranged in line with each other and separated by a perforated wall or partition, a suction-valve seated in said valve-chamber, a piston fitted in said piston-chamber and exposed on one side to the pressure produced by the compressor, a bolt passing loosely through the opening in the partition between said chambers, and a spiral spring surrounding said bolt and bearing at one end against said partition and at the opposite end against an adjustable abutment on said bolt, substantially as and for the purposes set forth.

3. In combined valve and governor mechanism for air-compressors the combination of a case open at one end, which is attachable to a compressor-cylinder, and formed with a suction-valve chamber having one or more lateral inlet-openings through the case, an annular discharge-valve chamber communicating at one end with the compressor-cylinder, a suction-valve, an annular discharge-valve, springs for holding said valves normally closed, a piston-chamber arranged in line with the suction-valve chamber and communicating therewith at the end opposite the cylinder, a piston fitted to work in said piston-chamber, a bolt projecting from the piston-chamber into the valve-chamber and surrounded by a spiral spring, means of adjusting the tension of said spring and a cap attachable to the valve-case over the piston-chamber, forming therewith a passage which communicates with the discharge-valve chamber and with the end of the piston-chamber opposite the valve-chamber, substantially as and for the purposes set forth.

4. In combined valve and governor mechanism for air-compressors the combination of a case open at one end, which is attachable to a compressor-cylinder, a bushing having an outwardly-turned part or flange with one or more openings through it and forming with said case an annular discharge-valve chamber which communicates through said opening or openings with the cylinder and through one or more longitudinal passages with the opposite end of the valve-case, a suction-valve having a seat in or on the end of the bushing toward the cylinder and a stem guided in said bushing, an annular discharge-valve fitted to slide upon said bushing and seated upon the outwardly-projecting flange thereof over the opening or openings therein, springs tending to hold said valves to their seats, a cap attachable to the outer end of said valve-case and forming a piston-chamber, a piston fitted in said chamber, a bolt passing from the suction-valve chamber outwardly into the piston-chamber, a spring coiled around said bolt and tending to move and hold it outwardly, a cap attachable to the outer end of the case, provided with a discharge connection and forming with the exterior of the piston-chamber a passage which communicates with the discharge passage or passages in the outer end of the case, with the outer end of the piston-chamber and with the discharge connection, and a ring fitted to turn on said case between a shoulder thereon and the outer cap, provided with a hose or pipe connection and forming with said case an annular passage which communicates with said pipe or hose connection, and through an opening in the case with the suction-valve chamber, substantially as and for the purposes set forth.

NIELS ANTON CHRISTENSEN.

Witnesses:
 JOHN DRISCOLL,
 HANS P. CLAUSSEN.